UNITED STATES PATENT OFFICE.

EDWARD C. KENDALL, OF ROCHESTER, MINNESOTA.

THYROID SUBSTANCE AND PROCESS OF MAKING IT.

1,392,768.     Specification of Letters Patent.     Patented Oct. 4, 1921.

No Drawing.     Application filed August 20, 1919. Serial No. 318,719.

*To all whom it may concern:*

Be it known that I, EDWARD C. KENDALL, a citizen of the United States, residing at Rochester, in the county of Olmsted and State of Minnesota, have invented certain new and useful Improvements in Thyroid Substances and Processes of Making Them, of which the following is a specification.

My invention relates to a new substance obtainable from the thyroid gland and possessing the physiologic activity of the thyroid secretion; and to a process of producing said substance by a chemical treatment of thyroid protein. This application is a continuation in part of my application Serial No. 102,302, filed June 7, 1916.

The new substance, which I shall hereinafter refer to as "thyroxin", contains iodin and appears to be the active constituent of thyroid secretion. A careful investigation of the physical and chemical properties of this substance discloses the presence of an imino group and a carboxyl group, making possible the formation of salts with both acids and bases.

The great reactivity which thyroxin exhibits appears to be due, in part, also to the presence of a carbonyl group in close proximity to the imino group. It has been found that the two groups—carbonyl and imino—can be hydrolyzed with the addition of the elements of water, a reaction which is typified in the two substances, creatinin changing to creatin. The ease with which thyroxin combines with the organic compounds with which it is naturally associated, and the great difficulty which is experienced in separating it therefrom and obtaining it in the pure form, are explained by the presence of these groups, the reactivities of which are accentuated by the presence of iodin and the general configuration of the molecule.

As a result of long-continued research, I have succeeded in isolating this active iodin-containing constituent of the thyroid, and in determining a practicable procedure for effecting its separation. After hydrolyzing thyroid protein in such a way as to minimize the decomposition of the iodin-containing substance, the step of primary importance is the treatment of an alkali-metal hydroxid solution of the acid-insoluble hydrolyzed products with barium hydroxid. The solution of acid-insoluble hydrolyzed products contains the thyroxin associated both chemically and physically with various organic impurities, some of them of a colloidal nature. The barium hydroxid destroys some of these impurities and forms a precipitate which is insoluble in sodium hydroxid. When this precipitate is removed, the product which can be precipitated by acidifying the remaining solution contains a much higher percentage of thyroxin than it did before. The manner in which this barium hydroxid treatment is combined with other purification steps to obtain finally the pure thyroxin, is set forth in detail in the following description.

In a container made of nickel or suitable alloy, the following ingredients in the following proportions are heated at 100° for twenty-four hours: For every part of fresh thyroid gland, 3 parts by weight of water and $\frac{1}{5}$ part by weight of sodium hydroxid or a corresponding proportion of other alkali-metal hydroxid to make about a $1\frac{1}{4}$ normal solution. Sodium hydroxid is added to the water and to this the thyroid glands are added in the form in which they are removed from the animal after the gross fat and strips of muscle have been removed as far as possible. The complete separation of the gland from the surrounding tissues is unnecessary. It is unnecessary to grind the material. The contents of the tank are stirred by causing the solution to boil by passing a steam pipe in the form of the letter U down to the bottom of the tank, the surface of this pipe to be of nickel. Steam passing through the pipe under high pressure produces heat which causes the solution to boil, and therefore circulate. After the material is allowed to heat for twenty-four hours with constant boiling by means of the steam coil 5 kilos of sodium chlorid are added for every 10 kilos of thyroid gland taken. The salt is dissolved and the solution is siphoned off into a suitable stoneware crock and allowed to cool slowly. This permits the fat and certain impurities which are insoluble in this strength of sodium hydroxid and sodium chlorid to rise in the form of a cake on the surface.

When the material has cooled, that is, after twenty-four hours' standing in the crock, the clear liquid under the layer of impurities is siphoned off. This separation is made as complete as possible. The solution contains a small amount of flocculent material, which is removed by filtering, for example, by gravity through a cheese-cloth bag made up of eight or ten thicknesses of cheese-cloth. The solution may also be filtered by passing through a suitable centrifuge separator. The filtered solution is perfectly clear, wine red, and slightly sirupy. It is placed in one or more glass containers and such a quantity of ice is added that on addition of acid the temperature does not rise above 25° C. The solution is acidified with 50 per cent. by volume sulphuric acid and allowed to stand twenty-four hours, with occasional stirring. A flocculent precipitate separates which settles to the bottom. Stirring assists the settling so that after twenty-four hours the supernatant liquid may be siphoned off. If it is clear it is discarded. If it is cloudy it may be filtered and the precipitate so recovered added to the precipitate in the bottom of the glass containers. The precipitate in the bottom of the glass containers is filtered by gravity or on a suction funnel, using infusorial earth to facilitate filtering, and is washed with a small amount of distilled water. From the discarded solution sodium sulfate may be recovered by evaporation of the water and the organic material may also be separated for the nitrogen contained.

The precipitate resulting from the acidification is dissolved in dilute sodium hydroxid, used in the following proportions:

In the first alkaline hydrolysis the tank contains 10 kilos of thyroid. The contents of two tanks are combined before the acidification, the precipitate resulting from the acidification being derived from 20 kilos of fresh thyroid gland. This precipitate is dissolved in 1 liter of water, the amount of sodium hydroxid added being such that only a slight excess is present after the solution. This alkaline solution is now filtered, which removes the infusorial earth and some sulfur which separates at this point. The alkaline solution is acidified with hydrochloric acid, the temperature being maintained below 25° C. After the addition of the acid the solution is allowed to stand a few minutes with occasional stirring. The precipitate is then filtered either with or without infusorial earth. If the precipitate is filtered without infusorial earth it may be dried in the air at room temperature. The dried precipitate containing an excess of hydrochloric acid is then added to 1,000 c. c. of alcohol. If the precipitate is filtered with infusorial earth the excess of water is removed by pressing the precipitate into as compact a cake as possible on the funnel. It is then dissolved in 1,000 c. c. of ethyl alcohol from 85 to 95 per cent. strong. Hydrochloric acid is added in small amount to assist the solution. The alcohol should have a distinctly acid reaction but a large excess of acid is to be avoided, from 10 to 15 c. c. of concentrated hydrochloric acid being sufficient. Solution is not complete but the insoluble constituents are removed by filtering and are kept separate. The alcohol solution is placed in a glass beaker and to this a solution of sodium hydroxid 30 per cent. is added. The acid is thereby neutralized, this treatment being continued until the alcohol reacts neutral to blue litmus paper. Neutralization of the acid precipitates a black tarry material which is allowed to separate for at least twelve hours. (Precipitate 1.) This is filtered off. The alcohol solution is returned to a clean glass flask and made acid with hydrochloric acid using such amount as to cause an acid reaction to blue litmus paper. Barium hydroxid is added to this alcohol solution until the solution is alkaline and the alcohol is boiled under a reflux condenser. This produces a precipitate (Precipitate 2) which is filtered after cooling the solution. One hundred cubic centimeters of distilled water and 5 gm. of barium hydroxid are added to the alcohol filtrate from Precipitate 2. The alcohol is removed by distillation and the aqueous residue is filtered from certain impurities which have formed an insoluble compound with barium. (Precipitate 3.)

The material which is sought is found distributed between the Precipitates 1, 2, and 3, and the filtrate from Precipitate 3. As stated above, thyroxin contains iodin, so that by the determination of iodin in these various precipitates the amount of thyroxin present can be determined. I have found that the compound containing iodin is the same in all of these precipitates, but that due to the impurities present, its chemical properties are changed. The treatment of the various precipitates depends upon the impurities present in each precipitate.

Out of Precipitate 1 so small a yield of the iodin compound is obtained that it seems best to discard this material as a source for the separation of the compound in crystalline form. Precipitate 2 contains an appreciable amount of the total which may be separated. For the separation of the iodin compound from Precipitates 2 and 3 and the filtrate from Precipitate 3 a method has been developed which is carried out in precisely the same manner, regardless of the purity of the material. The treatment is applied to five different groups: Group 1 consists of compounds insoluble in water in the presence of barium hydroxid. Group 2 consists of compounds soluble in water in the presence of barium hydroxid. Group 3 consists of precipitates obtained by precipitation with carbon dioxid. Group 4 consists of precipitates obtained by acidifying a solution with mineral acid, either hydrochloric or sulfuric. Group 5 consists of precipitates obtained from Group 3.

Precipitates 2 and 3, which are obtained by treating an alcohol solution of the thyroid split products with barium hydroxid, are separately suspended in 400 c. c. of distilled water and heated for thirty minutes at 100°, with stirring. The solution is then filtered. This separates the total precipitate into two portions,—one, those compounds which are soluble in the presence of barium hydroxid, and the other, those compounds which are insoluble in the presence of barium hydroxid.

I therefore have resolved the total products from the first alkaline hydrolysis into the following: first, one precipitate removed from the alcohol which is of such nature that none of the iodin compound can be separated; and subsequently, two precipitates insoluble in aqueous barium hydroxid solution and three solutions containing barium-soluble constituents. These are all kept separate but the barium-insoluble constituents are each treated by the same method and the barium-soluble constituents are each treated by a method which is identical for all solutions containing barium-soluble compounds.

The treatment of Group 1 constituents which are insoluble in the presence of barium in aqueous solution is as follows:

The insoluble barium precipitate is placed in a beaker and covered with 200 c. c. of water. Ten c. c. of 30 per cent. sodium hydroxid are added to the solution and the beaker is placed upon a hot plate and allowed to boil for ten to twelve minutes. The barium salt of thyroxin, which had been insoluble in water, is taken into solution by the hot sodium hydroxid, and the solution is filtered, practically all of the iodin compound being in solution.

This treatment of the insoluble barium precipitate may be outlined as follows:

*Group I compounds.*

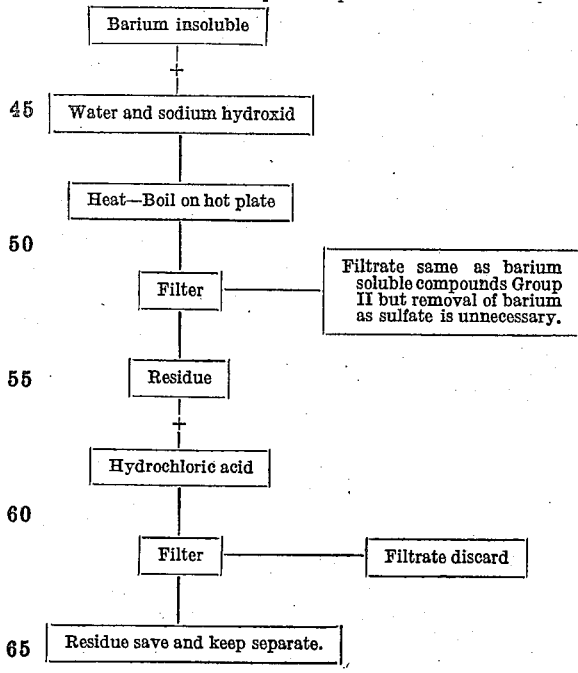

The treatment for a solution containing barium-soluble constituents is as follows: To the solution is added sodium sulfate which removes barium as barium sulfate, only sufficient sodium sulfate being added to precipitate all the barium. The precipitate of barium sulfate is removed by filtration with suction. The filtrate is cooled to 25° and is placed in a suitable beaker. Through this solution carbon dioxid is bubbled until a precipitate forms. If no precipitate forms after an hour's treatment with carbon dioxid the alkalinity is slightly reduced by addition of hydrochloric acid. If a precipitate forms it is removed by filtration and treated as Group 3 compounds. If no precipitate forms with continued treatment with carbon dioxid the solution is made distinctly acid with hydrochloric acid. Any precipitate that forms is removed by filtration and treated as Group 4 compounds. This series of steps may be illustrated as follows:

*Group II compounds.*

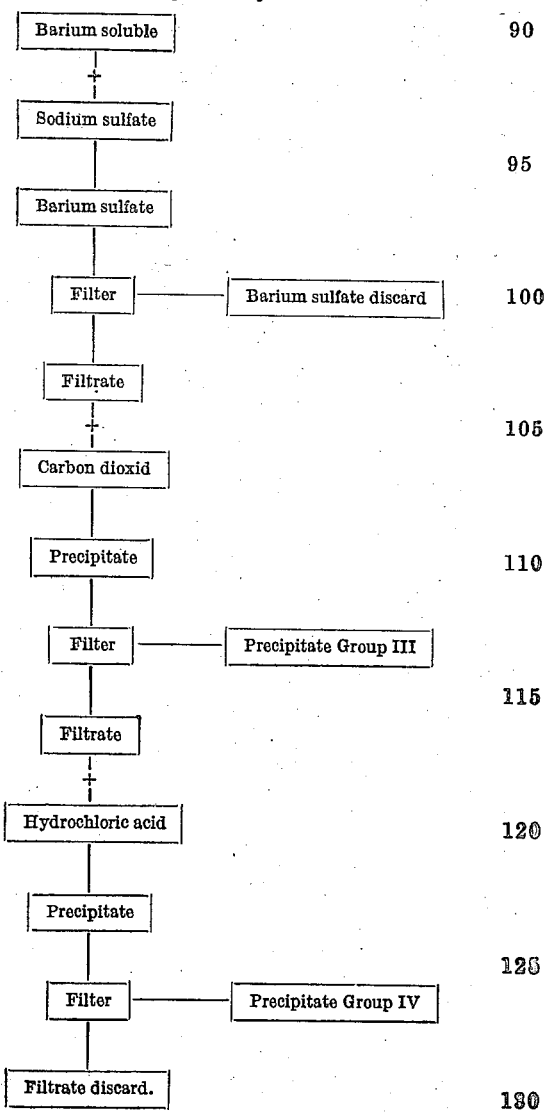

The third group of compounds, the precipitates obtained by carbon dioxid treatment, are obtained from the treatment of compounds of Groups 1 and 2 as described above. The carbon dioxid precipitates are of various degrees of purity. They are combined according to their state of purity, the dark-colored precipitates being combined and the light-colored precipitates being combined so as to make not more than two or three groups of precipitates. They are dissolved separately in dilute sodium hydroxid, the volume being not greater than 200 c. c., the amount of sodium hydroxid should be about 15 c. c. of 30 per cent. sodium hydroxid solution. These solutions are heated to boiling and to the hot solutions sodium chlorid is added in such amount as to make at least a 20 per cent solution of sodium chlorid. The solutions are then allowed to cool. Upon cooling a precipitate may separate (Group 5 compounds). It is crystalline in nature or else it separates as oily, tarry droplets. The process by which this precipitate is brought about is to produce such a high concentration of sodium salts in the solution that the sodium salt of the iodin compound which it is desired to precipitate is insoluble in the solution. Under these conditions the sodium salt separates in crystalline form. However, in the presence of certain impurities this crystalline form is altered and it appears as oily tarry droplets. When this process of purification has been carried on with a number of lots of thyroid there accumulate a large number of these solutions in various stages of purity.

Progressive purification is secured by combining precipitates of equal purity as may be judged from the character of the precipitation with carbon dioxid and by salting out. The filtrates, after filtering off the precipitate secured by salting out, are cooled by addition of ice and are acidified with hydrochloric acid; the resulting precipitate is reserved for the Group 4 treatment.

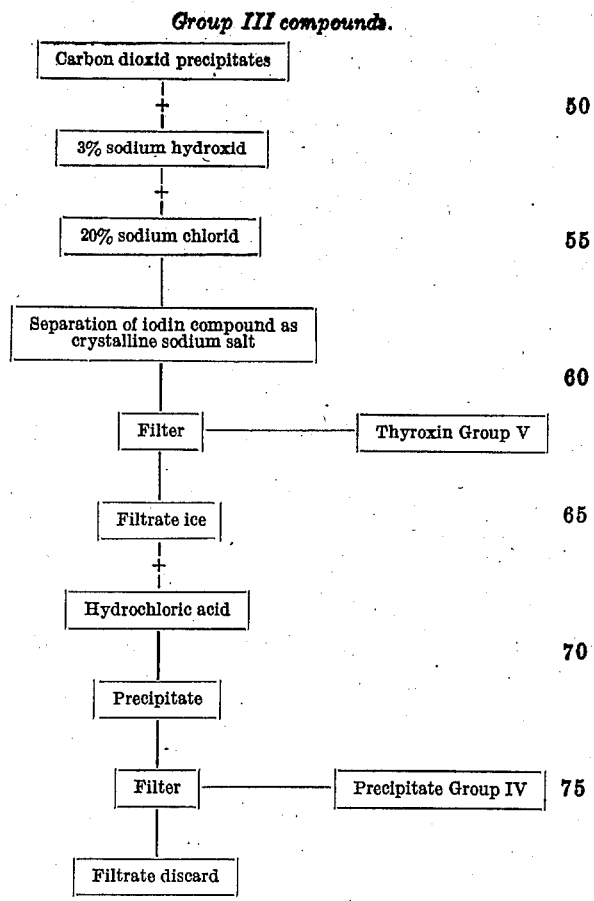

The fourth group of constituents is composed of precipitates secured by adding hydrochloric acid to the filtrates of the solutions which have been precipitated by saturating with carbon dioxid and to the filtrates of the precipitates that were secured by salting out the iodin compound with sodium chlorid. The precipitate is dissolved in a small volume 200 c. c. of dilute sodium hydroxid, using as slight an excess as possible. This is placed in a nickel crucible, is acidified with hydrochloric acid and 10 gm. of barium hydroxid are added. The solution is heated in an electric oven at 100° C. suitably covered so that evaporation does not occur to a large extent. After eighteen hours it is filtered. The precipitate is removed and treated precisely as described above for Group 1 barium-insoluble compounds. The filtrate is treated as described above for Group 2 barium-soluble compounds.

*Group IV.*

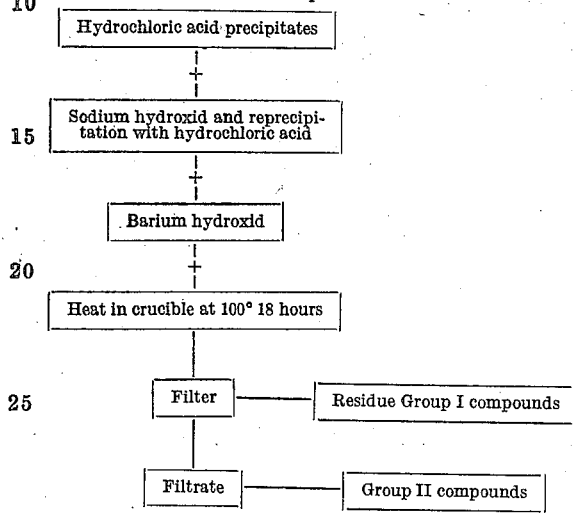

By carrying out the treatment outlined for compounds of Groups 1, 2, 3, and 4, the precipitate from Group 3 obtained by saturating with sodium chlorid accumulate (Group 5). In order to hasten the purification of the compound so that it will precipitate with sodium chlorid, it is desirable to utilize the treatment of Group IV compounds for purification of Group III compounds. While some of these precipitates are distinctly crystalline they are somewhat colored and are impure. The purification of this group (Group 5) of precipitates is as follows:

The crystals are dissolved in dilute sodium hydroxid with a volume of 200 c. c. The solution is heated on a water-bath for one hour at 100°. This will produce a flocculent dark-colored precipitate which does not contain any of the iodin compound desired and may be filtered out. The filtrate is treated precisely as Group 4 compounds.

Thyroxin forms di-metal salts in solutions of sodium potassium ammonium hydroxid which are very soluble. In solutions of carbonates thyroxin forms mono metal salts with its carboxyl group alone and these salts are very sparingly soluble. In order to take advantage of the slight solubility of the mono metal salts thyroxin is dissolved in alcohol containing but a slight excess of sodium hydroxid over the amount required for its solution. Carbon dioxid is then passed into the solution and it is allowed to stand about twelve hours. A precipitate usually forms at this point which is composed of impurities, possibly some of the iodin containing compounds and sodium carbonate. This is filtered off and the alcohol is distilled from the filtrate. The last traces of the alcohol are removed by boiling over a free flame. The water solution is now allowed to stand for from 5 to 6 days, during which time the mono metal salt of thyroxin will separate. It has been found that separation of the mono metal salts is greatly influenced by the factor of time. This separation can be applied to only partially purified solutions of thyroxin but the yield of the mono metal salt is not quantitative in the presence of large amounts of impurities. It has been found also that the length of time required for the separation of the mono metal salts is greatly increased by a large amount of impurities.

After sufficient treatment, sodium chlorid precipitates which are colorless and highly crystalline will be obtained. These may be purified by dissolving in ethyl alcohol from 85 to 95 per cent. strong containing a small amount of sodium hydroxid. This is acidified with acetic acid, the solution being heated to the boiling point of alcohol. A fine white crystalline precipitate separates. This may be further purified by disolving in sodium hydroxid of 3 per cent. strength and the addition of sodium chlorid in at least 20 per cent. strength. This precipitate may be again dissolved in alkaline alcohol and precipitated by addition of acetic acid, observing the conditions outlined above. The crystalline substance, thyroxin, thus obtained is the active constituent of the thyroid in the form of the free base, and contains 65 per cent. of iodin.

The final purification steps of Group 5 compounds are outlined as follows:

*Group V.*

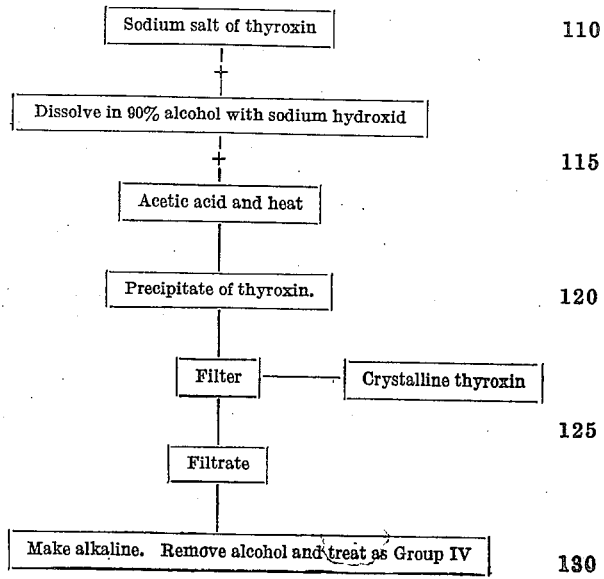

Although many changes may be made in the process, which has just been described in detail, without departing from my invention, I have found after much experimentation that there are five conditions which must be fulfilled before the new substance can be isolated in pure crystalline form. These are:

1. *The effect of temperature on the precipitation with an acid.*—When the partially purified iodin-containing constituents are precipitated by an acid the precipitate is flocculent and amorphous. If this is heated to 40 or 50° C. it assumes a fine granular form which can be filtered and washed very readily. This procedure was followed at first because of the facility of handling the precipitate. Warming of the acid solution does not break off any iodin in inorganic form. If, however, this precipate, which was prepared by warming the solution after the addition of the acid, is dissolved in alkali and heated with barium hydroxid, and the solution is again acidified, some iodin in the inorganic form may be found in the solution. If the precipitation by an acid is carried out in the cold, subsequent heating with barium hydroxid and reprecipitation does not break iodin off in the inorganic form.

2. *The effect of heating the alkaline hydrolysis solution in the presence of metal.*—In the first experiments the hydrolysis was carried out in glass flasks. When an 11-gallon galvanized-iron tank was substituted the hydrolysis was carried out apparently just the same, but it was found that with the metal the hydrolysis in an alkaline solution resulted in the breaking off of the iodin in the inorganic form. Investigation showed that in an alkaline solution iron, zinc, copper, tin, lead, German silver, and in fact, all metals except nickel and the heavy metals, gold, silver, and platinum, break iodin off from its organic combination. A heavy enameled cast-iron kettle was found to give a satisfactory surface for a container in which to carry out the primary hydrolysis with sodium hydroxid in alcohol. Later this was replaced by a nickel kettle.

3. *The effect of carbon dioxid.*—In effecting the separation of crystals in early experiments carbon dioxid was neither employed directly nor was its effect excluded from the various steps in the process. After many months of failure to separate more of the iodin compound in crystalline form it was found that carbon dioxid plays an important role in the separation of thyroxin from the impurities present. By chance an alkaline solution containing a partially purified preparation of thyroxin mixed with a large amount of impurities was precipitated with carbon dioxid instead of with sulfuric acid. The precipitate was filtered on a Buchner funnel and washed with distilled water. Instead of the distilled water running through lighter than the first filtrate, it was almost black. Investigation showed that the black impurities were insoluble in water saturated with carbon dioxid but that they were soluble in distilled water. Further investigation showed that there was some action of carbon dioxid on thyroxin when certain impurities were present which permitted its being separated in the crystalline form. The action of carbon dioxid appears to partially separate thyroxin from acidic indol impurities. Thyroxin is precipitated by carbon dioxid at a point slightly in advance of the impurities so that by alternate alkaline treatment with barium hydroxid and carbon dioxid precipitation thyroxin may be gradually separated.

4. *The effect of temperature during the treatment of a solution with carbon dioxid.*—After it was found that carbon dioxid had a very important action which allowed thyroxin to be isolated in crystalline form, carbon dioxid was added to the various solutions, first in the cold and then it was added to the solutions warmed to various temperatures up to 100° C. It was found that with the preparations which were contaminated with a large amount of impurities, the passing of carbon dioxid into a solution above 50 to 60° C. resulted in breaking off iodin. This was confirmed many times, and while for a long time unexplained, we found that it was a condition which has to be controlled so that when the solutions were treated with carbon dioxid it was always done in the presence of an iced solution.

5. *The effect of different samples of desiccated thyroid.*—The fifth point is one beyond control and was found to rest on the condition of the desiccated thyroid employed. Rarely do two samples of desiccated thyroid respond quite the same to the alkaline hydrolysis. It appears probable that bacterial or other decomposition so alters the proteins in some samples that it is impossible to separate any of the iodin compound.

The most important cause for the confusing conditions found during the separation is the fact that the progressive purification of the iodin compound changes its properties. The chemical properties of thyroxin are completely altered during the early stages of purification by the impurities which are present. Barium so affects the impurities that their solubilities in acid and alkali are changed sufficiently to allow of a separation of the iodin compound. Barium apparently does three things: It produces some degree of hydrolysis and destruction of some of the impurities, it forms a precipitate with some of the impurities which is insoluble in sodium hydroxid, and it also carries down mechanically certain of the colloidal impurities when it is precipitated by sodium sulfate. Very little of the iodin-containing compounds are carried down mechanically with barium sulfate. The solubility of thyroxin with barium was for a long time very confusing, but it was finally found to be as follows: When barium hydroxid is added to a solution of pure thyroxin dissolved in a small amount of sodium hydroxid, an insoluble barium salt is formed. The solubility of this barium salt is greatly influenced by three things. One is the amount of other barium salts in solution, the second is the presence of a strong alkali as sodium hydroxid, and the third is the temperature. In cold solutions, in the presence of other barium salts, the barium salt of thyroxin is very insoluble. It is slightly soluble in boiling water in the absence of other barium salts. It is completely soluble in boiling water in the presence of sodium hydroxid. The action of the sodium hydroxid appears to effect the OH group present in thyroxin, which is not sufficiently acidic in its nature to react with barium to form a soluble compound.

Some of the chemical properties changing with progressive purification are as follows:

Carbon dioxid and hydrochloric acid both will break off iodin from a partially purified preparation but after thyroxin has been separated in pure form they have no such action. The solubility of thyroxin in barium hydroxid is paradoxical at different stages of the purification. Partially purified thyroxin is soluble in sodium carbonate and in alcohol. Pure thyroxin is insoluble in both.

These paradoxical aspects can now be explained by the fact that thyroxin exists in two forms, which have two different chemical formulæ. In one the pyrrol ring is closed, and there is present an hydroxy group, or the enol form as it exists in alkaline solution. This has such slight acidic properties that it is insoluble in sodium carbonate, insoluble in barium hydroxid, and the compound is insoluble in alcohol. In the other form, instead of there being a closed pyrrol ring, the ring is opened with the addition of the elements of water and two new groups are formed,—the amino group and the carboxyl group. This carboxyl groups reacts readily with barium hydroxid and sodium carbonate carrying the substance into solution. The compound is also soluble in alcohol. In the body thyroxin exists in the open ring form, and the difficulties encountered in the separation of the substance are caused by the fact that the pyrrol ring will not close in the presence of certain impurities which always result as biproducts from the hydrolysis of the protein.

*Physical and chemical properties of thyroxin.*

The physical and chemical properties of pure thyroxin as it exists in the closed ring form are as follows: The compound is colorless, odorless and tasteless. It is soluble in sodium, potassium, and ammonium hydroxid but in the dry crystalline form it is but slightly soluble in sodium, potassium, or ammonium carbonate. It is precipitated from its alkaline solution by all acids stronger than and including carbonic acid. It is insoluble in all ordinary organic solvents. Slight solubility has been found with di-ethyl succinate but it is very insoluble in alcohol, in ether, petroleum ether, benzol, acetone, chloroform, carbon tetrachlorid, carbon disulfid and glacial acetic acid. It is exceedingly insoluble in water. It is slightly soluble in strong hydrochloric acid. Its solubility in dilute hydrochloric acid is one part in 200,000. When precipitated by mineral acid it forms a flocculent, amorphous, voluminous precipitate. If this solution is heated this may produce no effect. However, if sufficient acid is present, a change takes place, the precipitate becomes finely granular, crystalline in nature, and settles very rapidly to the bottom of the container.

A very remarkable property of the compound is its behavior in sodium hydroxid. It is practically indestructible in sodium hydroxid provided the temperature is not raised to too high a point. It is soluble in dilute sodium hydroxid. As the percentage is increased it becomes less and less soluble and at between 15 or 20 per cent. of sodium hydroxid the compound separates as a disodium salt. Further addition of hydroxid merely completes this precipitation so that the compound can be heated to 100° C. in as high as 50 per cent. sodium hydroxid without alteration, and it may be recovered simply by acidifying the solution.

The compound is soluble in alcohol containing hydrochloric acid but it is insoluble in alcohol containing acetic acid. A very convenient method for its crystallization is to dissolve it either in alcohol containing hydrochloric acid to which sodium acetate is added, or in alcohol containing sodium hydroxid, and then add acetic acid to this. It may also be precipitated by boiling its ammoniacal aqueous or alcohol solution.

The compound crystallizes in several forms, depending on the solution from which it is crystallized. When crystallized out of alcohol by adding acetic acid to its sodium salt the crystals are generally curved and in rosette form. The length of the needles varies with the temperature. When precipitated from a hot solution they are longer than when precipitated in the cold.

When precipitated by boiling the ammoniacal aqueous solution the crystals are long, slightly curved blades, generally in sheaf form. When precipitated by carbon dioxid out of water solution, an amorphous precipitate results unless the solution is warmed. If carbon dioxid is passed through an alkaline solution of thyroxin the hydroxy group of thyroxin is freed from metal and the molecule exists as a mono sodium salt. It is very slightly soluble and will separate in flat plates. Further addition of carbon dioxid will free the carboxyl group and thyroxin will precipitate.

When acetic acid is added to the sodium salt of thyroxin in alcohol it separates in crystalline form. When hydrochloric or sulfuric acid is added to the sodium salt of thyroxin dissolved in alcohol, no crystallization occurs. Thyroxin therefore forms an alcohol-soluble salt with mineral acids but not with acetic acid. The question suggested itself whether the salt would retain the acid radical after precipitation from water solution and drying. In order to determine this the compound was precipitated by a slight excess of sulfuric acid added to the aqueous solution of the compound. The acid solution was heated until the character of the precipitate changed from its amorphous form to its heavy crystalline condition. Analysis of these crystals showed that they contained 60 per cent. of iodin. Analysis of the crystals precipitated from alcohol by acetic acid showed that they contained 65 per cent. of iodin. This difference in the percentage of iodin was shown to be due to the formation of a salt with sulfuric acid. When the compound is crystallized out of water by boiling its ammoniacal salt it separates in the free-base form and contains 65 per cent. of iodin. When it is precipitated by hydrochloric acid it may crystallize in two forms: one is the hydrochlorid which separates in flat plates; the other is the typical free-base form. The sulfate appears to be very stable and is not hydrolyzed by boiling in water in the presence of sulfuric acid. The hydrochlorid, however, is more easily hydrolyzed by water.

The melting point of thyroxin is influenced by the time it takes to raise the temperature up to the melting point. When this is done at the rate of 10° per minute, the melting point is 240°. When the length of heating is prolonged, the temperature at which the substance melts is much lower and by very slow heating it can be reduced to 207°. The explanation appears to be that there is a decomposition of the substance with the liberation of iodin at temperatures above 160°. After the iodin has been liberated, the residue melts at a point somewhat over 200°. The extent of the decomposition apparently is greatly increased by the time factor, so it is possible to obtain any melting point from 207° to 248° merely by varying the length of time of heating. For the sake of stating some definite point, I have adopted the 10° per minute rate, at which the substance melts at 240°. There is considerable browning preceding the melting with the liberation of violet iodin vapors, but the melting point is marked by violent foaming, and is quite sharp no matter at what temperature it occurs. By hydrolysis of the mono sodium ammonium or potassium salts with cold water thyroxin may be prepared in the enol form. The melting point of thyroxin in the enol form is 204° instead of 240°, the melting point of the keto form.

The chemical analysis of thyroxin indicates that it is a halogen-containing polyhydroindol derivative containing a carboxyl group and having one of the carbon atoms of the five-atom ring attached directly to oxygen. The structural formula of thyroxin which appears to be necessary to account for its various chemical properties, is as follows:

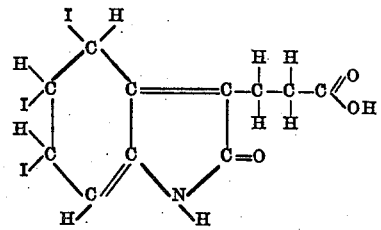

The indol nucleus will be referred to with the positions numbered as follows:

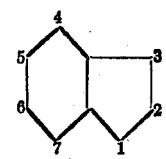

It may therefore be designated 4, 5, 6 trihydro, 4, 5, 6, tri-iodo, 2 oxy-beta indol propionic acid.

The formula, written more generically, would be:

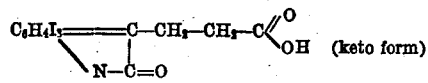

the corresponding formula for the tautomeric enol form being:

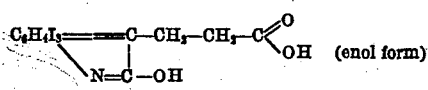

The pyrrol nucleus (or five-atom ring), as shown in the above formulas, has one of its carbon atoms attached to a carboxyl-containing radical, and another of its carbon atoms attached to an oxygen atom.

Evidence for the carboxyl group in thyroxin is its acid nature, its soluble alkali metal salts and insoluble heavy metal salts. The barium, copper, zinc and silver salts of thyroxin have been made and studied microscopically. These compounds are all beautifully crystalline, insoluble in water. The barium salt is made by adding barium chlorid to a solution of the sodium salt of thyroxin. The others are formed by dissolving thyroxin in strong ammonium hydroxid, dissolving the copper, silver or zinc salt in ammonium hydroxid and adding the ammoniacal solution of the metal to the alkaline solution of thyroxin. The salts separate in beautiful microscopic crystals. Analysis of the silver salt for iodin and silver shows that not one but two atoms of silver have been added to the compound. One atom of silver without doubt was added to the carboxyl, and the second atom to the hydroxy group, the compound existing in enol form.

The fact that there is both a carboxyl group and a hydroxy group is furnished by the di-methyl ester. Methyl-iodid added to the di-silver salt of thyroxin forms the di-methyl ester. This is insoluble in sodium hydroxid. Heating with dilute alkali renders the compound soluble but still one methyl group is attached and it will withstand severe alkaline treatment. The difference in the ease with which one methyl group saponifies is evidence that the two methyl groups are attached differently. Presumably one is attached to a carboxyl group, the other to a hydroxy group, as in the following formula:

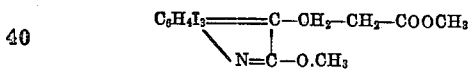

The best evidence for the imino group is its formation of the ureid with cyanic acid. The sodium salt of thyroxin reacts with potassium cyanate in glacial acetic acid very readily and forms a compound soluble in glacial acetic acid. Analysis of this compound agrees with that calculated for the ureid.

Evidence for the existence of the keto form with the hydrogen of the imino is furnished by the formation of the ureid with cyanic acid and by the formation of the acetyl and formyl imides with acetic anhydrid and formic acid chlorid. A carbonic acid derivative may also be made by reacting with phosgene and with ethyl-formic acid-chlorid.

It is known that the carbonyl group when present in a molecule adjacent to the imino group does not condense with hydrazine. Thyroxin will not condense with hydrazine. This is evidence that the carbonyl group is not present in the molecule in any position other than on the alpha carbon to the imino.

The carbonyl group in alkaline solution is changed by the migration of the hydrogen from the imino group to the hydroxy form. This may be shown by the mono-methyl derivative. When thyroxin is dissolved in sodium hydroxid, the second sodium atom adds to the hydroxy group. When the hydrogen is substituted, for example, by acetyl, the hydroxy group can not form. Under these conditions, solution in sodium hydroxid results in an opening of the ring with the formation of a second carboxyl group. The acetyl is very much more acidic than thyroxin. It is soluble in barium hydroxid, sodium carbonate, very dilute ammonia and even in pyridin. Thyroxin is difficultly soluble in ammonia, very slightly soluble in sodium carbonate and not at all in pyridin. The opening of the pyrrol ring when the acetyl derivative replaces the hydrogen of the imino can be duplicated with thyroxin itself without replacing the hydrogen of the imino when certain other substances are present, and it appears that when thyroxin exists in the body it is present in the open form with the carboxyl and amino groups instead of the imino and carbonyl groups.

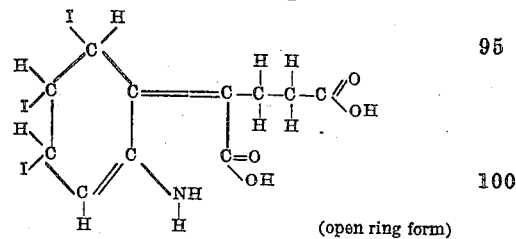

(open ring form)

When thyroxin exists in the open ring form with the carboxyl and amino groups, it is soluble in barium hydroxid, soluble in sodium carbonate and soluble in alcohol. This chemical structure emphasizes the importance of the $NH_2$ and $COOH$ groups which occur in the body. It is probable that the iodin is present in the molecule merely to increase the reactivity and sensitiveness of the functioning part of the molecule, namely, the $NH_2$ and $COOH$ groups. These groups would undoubtedly function to some degree if the iodins were substituted either by chlorin, bromin or hydrogen. The gross chemical possibilities would not be changed, but the degrees of reactivity would be effected.

The fact that the compound exerts its influence within the animal organism for days after a single injection proves that it is not destroyed in carrying out its physiologic action, and suggests that it acts as a catalyst.

The physiological activity of thyroxin is shown by an increased pulse rate, increased rate of metabolism and all the typical and well known physiological effects of desiccated thyroid. It will relieve the symptoms of myxedema and cretinism. In its administration it may be diluted with suitable admixtures of milk sugar, starch, cane sugar, and the like. Its dosage varies with the individual, but the limits are between ⅓ to 2 mg. per day, for the condition of cretinism and myxedema. In cases of obesity the amount used may be increased to 4 or 5 mg. per daily dose. The great effect of thyroxin on the basal metabolic rate is the explanation of its important physiologic action.

I claim:—

1. A process of treating thyroid proteins which comprises hydrolyzing said proteins with an alkaline solution, removing insoluble impurities, acidifying the solution while preventing its temperature from rising materially above 25° C., allowing the mixture to stand with occasional stirring until a flocculent precipitate settles, separating the precipitate and dissolving it in a sodium hydroxid solution and filtering to remove any insoluble residue, acidifying the solution with hydrochloric acid while maintaining the temperature below 25° C., filtering off the resulting precipitate and dissolving it in ethyl alcohol of from about 85 to 95 per cent. strength to which a little hydrochloric acid has been added, filtering off insoluble constituents, making the filtrate neutral with sodium hydroxid and filtering to remove precipitated matter, again slightly acidifying the alcohol with hydrochloric acid, mixing barium hydroxid with the filtrate and heating to cause a precipitate containing thyroxin, filtering off said precipitate, and adding water containing barium hydroxid to the filtrate, evaporating the alcohol and separating the products dissolved in the remaining aqueous solution into barium hydroxid-soluble and barium hydroxid-insoluble portions; heating the two above mentioned thyroxin containing precipitates with distilled water to separate them into barium hydroxid-soluble and barium hydroxid-insoluble portions; heating the residues comprising the barium hydroxid-insoluble portions with dilute sodium hydroxid solution while excluding carbon dioxid, filtering and reserving this filtrate; treating the solutions containing barium hydroxid-soluble portions with just sufficient sodium sulfate to precipitate all the barium as barium sulfate, filtering off the barium sulfate, treating the resulting filtrates and also the reserved filtrate with carbon dioxid until precipitates form, dissolving the precipitates in dilute sodium hydroxid solutions, the precipitates of similar degrees of purity having been combined, heating the solutions to boiling and adding enough sodium chlorid to make at least a 20 per cent. solution thereof, allowing the solutions to cool and to form crystalline precipitates, dissolving the precipitates in dilute sodium hydroxid and heating for about one hour at 100° C., filtering off and discarding any precipitates which form, acidifying the filtrates with hydrochloric acid and adding barium hydroxid, heating the mixtures for several hours at about 100° C. while preventing evaporation of water, separating the solutions, which contain the barium hydroxid-soluble compounds, from the residues, which contain the barium hydroxid-insoluble compounds, subjecting these last mentioned residues and solutions to the series of steps above mentioned for the treatment of the barium hydroxid-insoluble portions and the solutions containing barium hydroxid-soluble portions, respectively, and repeating this series of steps until the precipitates which are obtained by heating the 20% sodium chlorid solutions and cooling, are colorless and highly crystalline; dissolving these crystalline precipitates in ethyl alcohol of from 85 to 95 per cent. strength containing a small proportion of sodium hydroxid, acidifying with acetic acid, heating the solution to the boiling point of alcohol, and removing the resulting fine white crystalline precipitate containing 65 per cent. of iodin.

2. In the process of preparing a physiologically active substance from thyroid, the steps which comprise mixing barium hydroxid with an alcoholic solution of acid-insoluble products of hydrolyzed thyroid protein, heating the alcohol to boiling and filtering off the resulting precipitate.

3. In the process of preparing a physiologically active substance from thyroid, the step which comprises mixing barium hydroxid with an acid neutral or alkaline alcoholic solution of acid-insoluble products of hydrolyzed thyroid protein.

4. In the process of preparing a physiologically active substance from thyroid, the step which comprises mixing barium hydroxid with a hydrochloric acid-containing alcoholic solution of acid-insoluble products of hydrolyzed thyroid protein.

5. In the process of preparing a physiologically active substance from thyroid, the steps which comprise suspending in water the precipitate obtained according to claim 2, and heating the precipitate with sodium hydroxid, and filtering to obtain a filtrate containing the physiologically active substance in solution.

6. In the process of preparing a physiologically active substance from thyroid, the steps which comprise treating with carbon dioxid an alkaline solution of the partially purified barium hydroxid-soluble or insoluble, acid-insoluble products of hydrolyzed thyroid protein until a precipitate forms, and removing the precipitate from the solution.

7. In the process of preparing a physiologically active substance from thyroid, the steps which comprise treating with carbon dioxid an alkaline solution of the partially purified barium hydroxid-soluble or insoluble, acid-insoluble products of hydrolyzed thyroid protein until a precipitate forms, removing the precipitate and dissolving it in a dilute solution of an hydroxid of an alkali-metal, heating the solution to boiling and adding enough chlorid or other salt of the same alkali-metal to form at least a 20 per cent. solution of said alkali-metal chlorid, and allowing the solution to cool and form a precipitate.

8. In the process of preparing a physiologically active substance from thyroid, the step which comprises the formation of a mono-metal salt by allowing the alkali metal hydroxid or carbonate solution of thyroxin containing the proper hydrogen-ion concentration to stand several days during which time the mono-metal salt of the physiologically active substance will separate in crystalline form.

9. In the process of preparing a physiologically active substance from thyroid, the step, as described in claim 8, which comprises separation of the mono-metal salt by producing the proper hydrogen-ion concentration for the separation of this salt.

10. In the process of preparing a physiologically active substance from thyroid, the step which comprises producing proper conditions for the separation of the mono-metal salt by dissolving thyroxin in alcohol containing an excess of sodium hydroxid, passing carbon dioxid in the solution, filtering off the precipitate formed after the solution has been standing, removing the alcohol from the filtrate, and permitting the solution to stand until the mono-metal salt of thyroxin separates.

11. In the process of preparing a physiologically active substance from thyroid, the step which comprises treating the impure physiologically active substance dissolved in a solution of an hydroxid of an alkali-metal with a sufficient amount of salt of said alkali-metal to cause the alkali-metal salt of said active substance to precipitate.

12. In the process of preparing a physiologically active substance from thyroid, the steps which comprise heating a dilute sodium hydroxid solution of the impure physiologically active substance with enough sodium chlorid to form at least a 20 per cent. solution thereof, and allowing the solution to cool and form a precipitate comprising the sodium salt of said active substance.

13. A process of purifying the slightly impure physiologically active iodin-containing substance of the thyroid, which comprises dissolving the impure substance in alcohol containing a solubilizing agent, and then heating the solution in the presence of acetic acid or a salt of acetic acid to cause said active substance to separate out in the form of the free base.

14. A process of purifying the slightly impure physiologically active iodin-containing substance of the thyroid, which comprises dissolving the impure substance in ethyl alcohol of from 85 to 95 per cent. strength containing a small per cent. of sodium hydroxid, acidifying the solution with acetic acid and heating it to induce the formation of a crystalline precipitate.

15. A process of separating impurities from the physiologically active iodin-containing substance of the thyroid, which comprises treating with barium hydroxid an alkali-metal hydroxid solution of the acid-insoluble products of hydrolyzed thyroid protein.

16. A thyroid product comprising a substantially pure substance containing at least 65% of organically bound iodin and capable of producing tachycardia and increasing metabolism.

EDWARD C. KENDALL.